United States Patent
Craig

[15] 3,693,275
[45] Sept. 26, 1972

[54] FISHING LURE

[72] Inventor: Jack Q. Craig, 44 N.W. 101st Ave., Portland, Oreg. 97229

[22] Filed: Sept. 30, 1970

[21] Appl. No.: 76,699

[52] U.S. Cl. ............... 43/15, 43/42.04, 43/42.06, 43/42.21, 43/42.35, 43/42.39, 43/42.72
[51] Int. Cl. ............................................ A01k 85/00
[58] Field of Search...... 43/42.04, 42.21, 42.2, 42.72, 43/42.35, 42.02, 42.39, 15

[56] References Cited

UNITED STATES PATENTS

| 155,266 | 9/1874 | Sprague | 43/15 |
|---|---|---|---|
| 608,063 | 7/1898 | Mintzer | 43/15 |
| 1,538,658 | 5/1925 | Rindt | 43/42.02 |
| 3,035,368 | 5/1962 | Collins | 43/42.39 |
| 3,393,466 | 7/1968 | LeMaster | 43/42.35 |
| 2,153,489 | 4/1939 | Whitis | 43/42.72 |
| 998,238 | 7/1911 | Dineen | 43/42.2 |
| 2,078,816 | 4/1937 | Shenitz | 43/42.21 X |

*Primary Examiner*—Samuel Koren
*Assistant Examiner*—Daniel J. Leach
*Attorney*—Fulwider, Patton, Rieber, Lee & Utecht

[57] ABSTRACT

A fishing lure for connection to a leader and adapted to trail a fishhook, the lure including a bias means which yields when a fish initially strikes the fishhook, the lure further including a relatively heavy mass to provide inertial resistance to movement so that the fishhook is abruptly and forcibly set when the bias means ceases to yield further.

4 Claims, 4 Drawing Figures

PATENTED SEP 26 1972 3,693,275
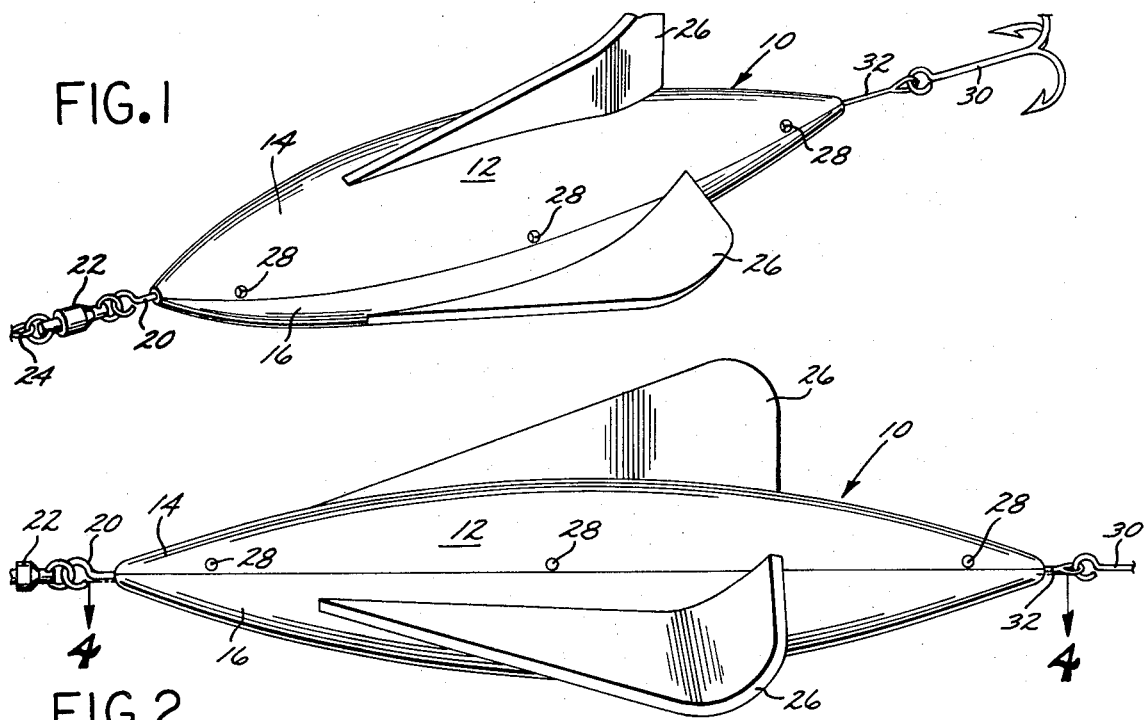
FIG.1
FIG.2
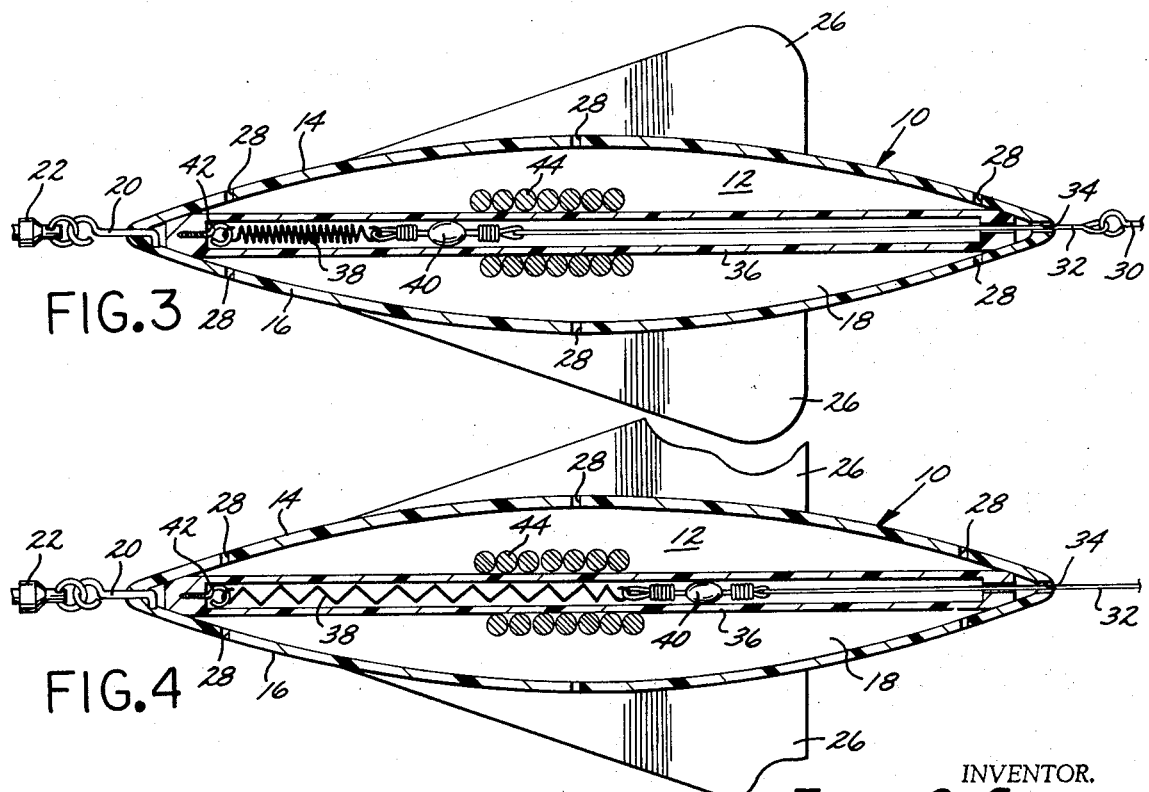
FIG.3
FIG.4
INVENTOR.
JACK O. CRAIG
BY Fulwider, Patton, Rieber,
Lee and Utecht
ATTORNEYS

FISHING LURE

BACKGROUND OF THE INVENTION

1. Field of the Invention

The present invention relates to a fishing lure and more particularly to a fishing lure in which the fishhook is enabled to initially yield upon being struck by a fish.

2. Description of the Prior Art

With the usual lure, whether it be towed from a boat or cast and pulled in, there is a certain amount of sag or catenary in the line. This allows a fish to take the bait and fishhook in his mouth in an exploratory fashion, gradually taking slack out of the sagging line, and usually without the fisherman knowing that the bait has been taken. Consequently, before the fisherman can even feel a tug on the line, the fish may reject the bait because he does not like the taste, he may notice the hook, etc. Certain lures in the prior art further aggravate this problem by incorporating a resilient section in the line, or by including in the lure itself some mechanism to provide yieldability, so that when a fish first strikes the fishhook the hook yields even prior to the taking up of the sag or catenary in the line itself. Apparently the theory of operation of such devices is that if the fishhook becomes lodged upon an underwater obstruction, or if the hook is struck by a very heavy fish, that the shock will not break the line or tear the fishhook out of the fish's mouth. Such devices do not provide any means for suddenly or forcibly setting the fishhook once the initial yieldability or slack is taken out of the yieldable portion of the line or the yieldable mechanism in the lure itself. Consequently, many fish are lost because no means are provided for forcibly setting the fishhook during the exploratory pass by the fish at the hook, and prior to the time that the fisherman feels any tug on the line.

SUMMARY

According to the present invention a fishing lure is provided which includes a bias means coupling the body of the lure and the fishhook which is trailed by the lure. This arrangement permits the fishhook to be moved rearwardly relative to the lure body when the fishhook is struck by a fish. The lure further includes a relatively heavy mass which offers inertial resistance to changes in movement of the lure, which is designed to be towed in a trolling operation or pulled through the water after a cast. Consequently, after the initial yielding movement of the fishhook when it is first struck by the fish, further movement of the fishhook is abruptly stopped and the relatively heavy mass incorporated in the lure suddenly and forcibly sets the fishhook in the fish's mouth, despite the fact that there may be an appreciable sag or catenary in the towing or casting line. Curved fins may be provided on the lure body to give the body a spinning motion as it passes through the water. Once the movement of the fishhook against the bias of the bias means is suddenly terminated, as just mentioned, any force by the fish tending to move the lure body rearwardly is further resisted by the resistance of the body to any slowing of its spinning, or to any reverse spinning.

Other objects and features of the invention will become apparent from consideration of the following description taken in connection with the accompanying drawing.

BRIEF DESCRIPTION OF THE DRAWING

FIG. 1 is a perspective view of a fishing lure according to the present invention;

FIG. 2 is a side elevational view of the lure of FIG. 1;

FIG. 3 is a longitudinal cross sectional view of the lure of FIG. 2, and illustrating the retracted position of the elongated element which is coupled to the fishhook; and FIG. 4 is a view similar to FIG. 3, but illustrating the elongated element in its extended position.

DESCRIPTION OF THE PREFERRED EMBODIMENT

Referring now to the drawings, there is illustrated a fishing lure 10 comprising an elongated, streamlined body 12 which is preferably made of plastic material formed into complemental body halves 14 and 16 which define a hollow interior 18. The body halves 14 and 16 are connected together in any suitable manner, such as by utilizing an adhesive or plastic solvent at the points where the body halves fit together.

The forward end of the body 12 includes an opening through which an eye 20 is carried, the eye 20 providing a means for connection of the lure 10 to the swivel 22 of a leader 24 of a usual fishing line (not shown).

The body 12 is fitted with four fins 26 whose trailing edges are curved as illustrated so as to give the body 12 a counterclockwise spinning action, as viewed toward the direction of movement of the lure 10.

The forward and rearward extremities of the body 12 and also the midportion of the body 12 are provided with openings 28 to enable water to enter into the hollow interior 18 to reduce the buoyancy of the lure 10.

The lure 10 is adapted to trail a usual barbed fishhook 30 by means of an elongated element or line 32 which extends into the hollow interior 18 through an opening 34 provided in the trailing end of the body 12. The line 32 is axially or longitudinally slidable through the opening 34 and through an aligned opening provided in the rearward end of an elongated tube 36 which is adhesively secured at its rearward and forward ends to the rearward and forward interior surfaces of the body 12, as best seen in FIGS. 3 and 4.

The line 32 is attached to one end of a bias means or tension spring 38 by means of a swivel 40. The spring 38 extends forwardly and within the interior of the tube 36, being connected to an eye 42 mounted to the forward end of the tube 36. When the line 32 is initially pulled, as when the hook 30 is struck by a fish, the spring 38 will stretch for approximately an inch and a half, at which time the swivel 40 and its associated connections will engage and abut against the rearward or trailing end of the tube 36 which forms a part of the body 12. This brings the resilient pay-out of the spring 38 to an abrupt halt. It is important to note that once the pay-out of the line 32 is stopped, the tendency of the lure 10 to move rearwardly to take the usual sag out of the towing fish line is resisted by an inertial mass constituted of a coil of lead weight 44 which is wrapped about the exterior of the tube 36.

As previously indicated, with the usual lure the sag or catenary in the towing fish line permits a fish to take the bait and hook in his mouth in an exploratory fashion, gradually taking slack out of the line sag, without the fisherman knowing that the bait has been taken. Often the fish then rejects the bait and a catch is lost. With the lure 10 of the present invention, the fish may take the bait and hook in an exploratory fashion, gradually extending the spring 38 as the line 32 is resiliently pulled outwardly. When the yieldable pay-out of the line 32 is abruptly halted, the sudden stop forcibly sets the hook in the fish's mouth, and without any necessity for the fisherman to jerk on the line to set the hook. The setting of the hook is enabled by inertia of the lure 10 provided by the lead weight 44 and the lure spinning provided by the fins 26.

Various modifications and changes may be made with regard to the foregoing detailed description without departing from the spirit of the invention.

I claim:

1. A fishing lure comprising:

an elongated hollow body having an opening in one extremity and configured to be pulled through the water;

an elongated element extending and freely slidable through said opening;

a bias means located in the hollow interior of said body, coupling said body and said element, and enabling comparatively easy, resilient relative movement of said element outwardly of said body, said element being otherwise unconstrained against free axial slidable movement, said bias means including swivel means enabling rotation of said body relative to and about the longitudinal axis of said element;

stop means engageable between said element and said body to abruptly halt said relative movement;

a relatively heavy mass carried by said body and offering inertial resistance to changes in movement of said body whereby coupling of said body to one of a leader and a fishhook, and coupling of said element to the other of said leader and said fishhook, enables a fish striking the fishhook to initially effect said comparatively easy relative movement of said element and thereafter forcibly set the fishhook upon abrupt cessation of said relative movement by said stop means; and a plurality of curved fins mounted to the exterior of said body and operative to spin said body about said longitudinal axis upon forward movement of said body through the water whereby there is provided additional inertial resistance to rearward movement of said body by a fish striking the fishhook.

2. A fishing lure according to claim 1 wherein said bias means is a tension spring.

3. A fishing lure according to claim 1 wherein said opening is in the trailing extremity of said body, said body is adapted for coupling to the leader, and said element is adapted for coupling to the fishhook.

4. A fishing lure according to claim 1 wherein said swivel means is located within the hollow interior of said body.

* * * * *